United States Patent
Tokuda

(10) Patent No.: US 10,863,038 B1
(45) Date of Patent: Dec. 8, 2020

(54) APPARATUS, METHOD, AND STORAGE MEDIUM FOR CHARACTER RECOGNITION PROCESSING

(71) Applicant: TOSHIBA TEC KABUSHIKI KAISHA, Tokyo (JP)

(72) Inventor: Satoshi Tokuda, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/576,695

(22) Filed: Sep. 19, 2019

(51) Int. Cl.
*H04N 1/00* (2006.01)

(52) U.S. Cl.
CPC ....... *H04N 1/00005* (2013.01); *H04N 1/0001* (2013.01); *H04N 1/0009* (2013.01); *H04N 1/00018* (2013.01); *H04N 1/00034* (2013.01); *H04N 1/00498* (2013.01); *H04N 1/00933* (2013.01); *G06K 2209/01* (2013.01)

(58) Field of Classification Search
CPC ........... H04N 1/00005; H04N 1/00034; H04N 1/00933; H04N 1/00936; G06K 2209/01
USPC ......................................... 358/1.11, 1.9, 1.18
See application file for complete search history.

(56) References Cited

U.S. PATENT DOCUMENTS

| 2012/0075648 A1* | 3/2012 | Keys | G06K 9/00979 358/1.11 |
| 2012/0096348 A1* | 4/2012 | Nagamine | H04N 1/0044 715/273 |

FOREIGN PATENT DOCUMENTS

JP     2004-215067 A     7/2004

\* cited by examiner

*Primary Examiner* — Jamares Q Washington
(74) *Attorney, Agent, or Firm* — Foley & Lardner LLP

(57) ABSTRACT

An information processing apparatus includes an interface and a processor. The interface may acquire an image, such as by scanning or received via an interface, such as a facsimile machine. The processor may use a character recognition engine to execute a character recognition process on the image. The process is configured to stop the character recognition process on the image when the elapsed recognition process time exceeds a predetermined threshold value. The processor is further configured to restart the character recognition process on the image when a restart condition is satisfied. As such, the processor thus may skip certain images that require unusually long processing time for character recognition and the processor may process and send out results on other images that do not require excessive character recognition processing time.

19 Claims, 2 Drawing Sheets

APPARATUS, METHOD, AND STORAGE MEDIUM FOR CHARACTER RECOGNITION PROCESSING

FIELD

Embodiments described herein relate generally to an information processing apparatus, an information processing method, and a storage medium.

BACKGROUND

An information processing apparatus can perform an optical character recognition (OCR) process to recognize characters in an image when the image is acquired by a facsimile machine or the like. Such an information processing apparatus could require significant time for an OCR process, for example, when noise such as dots is present in an image. In such a case, other jobs (such as other images queued) involving the OCR process may be delayed due to the prolonged OCR process of the noisy image.

DETAILED DESCRIPTION

In general, according to one embodiment, an information processing apparatus includes an interface and a processor. The interface acquires an image. The processor causes a character recognition engine to execute a character recognition process on the image, when time elapsed since start of the character recognition process for the image exceeds a predetermined threshold value, causes the character recognition engine to stop the character recognition process for the image, and when a restart condition is satisfied, causes the character recognition engine to restart the character recognition process for the image.

Hereinafter, embodiments will be described with reference to the drawings.

An image forming apparatus (information processing apparatus) according to an embodiment acquires an image by a facsimile machine or the like. The image forming apparatus recognizes characters in the acquired image by an OCR process (character recognition process). The image forming apparatus adds information indicating the recognition result to the acquired image. The image forming apparatus creates a file including the image to which the information is added.

For example, the image forming apparatus is formed as a multifunction peripheral that performs printing, scanning, copying, and the like.

Figure 1:
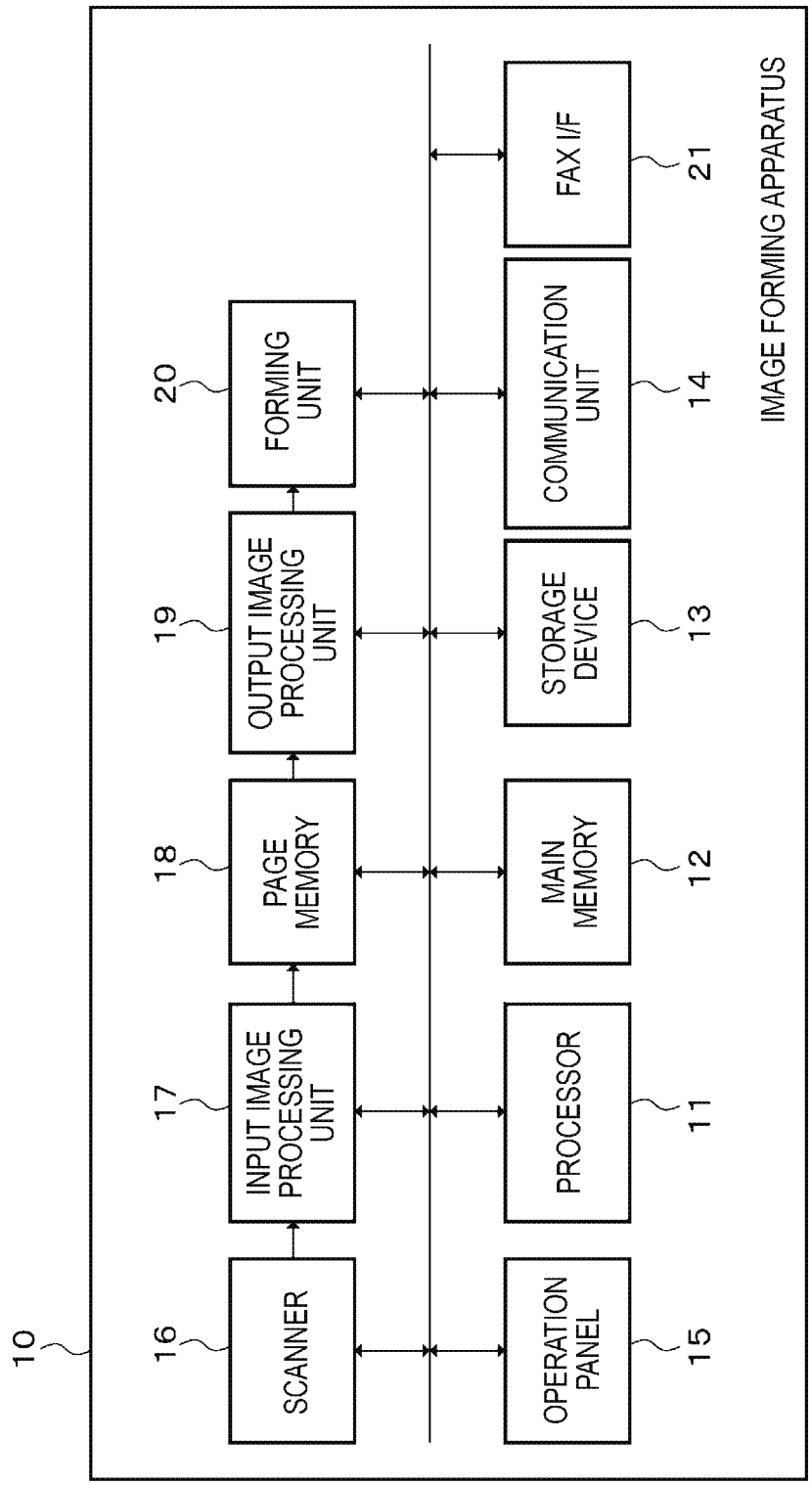
FIG. 1 is a block diagram showing an example of the configuration of an image forming apparatus according to an embodiment.

FIG. 1 is a block diagram showing an example of the configuration of an image forming apparatus 10 according to an embodiment.

As shown in FIG. 1, the image forming apparatus 10 includes a processor 11, a main memory 12, a storage device 13, a communication unit 14, an operation panel 15, a scanner 16, an input image processing unit 17, a page memory 18, an output image processing unit 19, a forming unit 20, a fax interface 21, and the like. The respective units are connected to one another via a data bus or the like. The image forming apparatus 10 may have a configuration as needed other than the configuration shown in FIG. 1, or a specific configuration may be excluded from the image forming apparatus 10.

The processor 11 has a function of controlling, or is configured to control, the overall operation of the image forming apparatus 10. The processor 11 may include an internal memory, various interfaces, and the like. The processor 11 implements various processes by executing programs stored in advance in the internal memory or the storage device 13 or the like.

Some of the various functions implemented by executing programs by the processor 11 may be implemented by a hardware circuit. In this case, the processor 11 controls the functions executed by the hardware circuit.

The main memory 12 is a volatile memory. The main memory 12 is a working memory or a buffer memory. The main memory 12 stores various application programs based on instructions from the processor 11. In addition, the main memory 12 may store data necessary for executing the application program, an execution result of the application program, and the like.

The storage device 13 (storage medium) is a non-volatile memory capable of writing and rewriting data. The storage device 13 includes, for example, a hard disk drive (HDD), a solid state drive (SSD), a flash memory, or the like. The storage device 13 stores a control program, an application, various data, and the like according to the operation application of the image forming apparatus 10.

In addition, the storage device 13 stores an OCR engine (character recognition engine) for performing an OCR process. The OCR engine will be described later.

The communication unit 14 is an interface for communicating with an external device. The communication unit 14 is connected to an external device through a network such as the Internet. For example, the communication unit 14 is an interface that supports wired or wireless local area network (LAN) connection.

Various operations are input to the operation panel 15 by an operator. The operation panel 15 transmits a signal indicating the operation input by the operator to the processor 11. The operation panel 15 includes, for example, a keyboard, a numeric keypad, a touch panel, and the like as an operation unit.

In addition, the operation panel 15 displays various types of information to the operator. That is, the operation panel 15 displays a screen showing various types of information based on the signal from the processor 11. The operation panel 15 includes, for example, a liquid crystal display as a display unit.

The scanner 16 optically scans an original document and reads an image of the original document as image data. The scanner 16 reads an original document as a monochrome image or a color image. The scanner 16 includes a sensor array and the like formed in a main scanning direction. The scanner 16 reads the entire original document by moving the sensor array in a sub-scanning direction. The scanner 16 may move the original document in the sub-scanning direction.

The input image processing unit 17 processes the image data read by the scanner 16. The input image processing unit 17 may process image data from devices other than the scanner 16. For example, the input image processing unit 17 may process image data sent from a universal serial bus (USB) memory, a PC, a smartphone, or the like.

The page memory 18 stores the image data processed by the input image processing unit 17.

The output image processing unit 19 processes the image data stored in the page memory 18 so that the forming unit 20 can print the image data on a sheet.

The forming unit 20 prints the image data processed by the output image processing unit 19 on a sheet based on the control of the processor 11.

The forming unit 20 prints image data on a sheet by, for example, an electrophotographic method. In addition, the forming unit 20 includes a transfer body, a roller for driving the transfer body, and an image forming section for forming an image on the transfer body.

The fax interface 21 is an interface for receiving facsimile data from a facsimile transmission source. The facsimile data includes the address of the transmission source and the image of the facsimile machine (facsimile image). The fax interface 21 sends the facsimile data to the processor 11.

For example, the fax interface 21 is an interface for connection to a telephone line and the Internet.

In addition, the fax interface 21 may be formed integrally with the communication unit 14.

Next, the functions implemented by the image forming apparatus 10 will be described. The functions implemented by the image forming apparatus 10 are implemented by executing programs stored in the storage device 13 or the like by the processor 11.

First, the processor 11 has a function of acquiring one or more images. That is, the processor 11 may acquire one image or may acquire a plurality of images.

Here, the processor 11 acquires an image by a facsimile machine.

The facsimile transmission source transmits facsimile data to the address of the image forming apparatus 10. The processor 11 receives the facsimile data from the transmission source through the fax interface 21. The processor 11 acquires a facsimile image or facsimile images of the facsimile data as the one or more images.

The processor 11 also has a function of causing the OCR engine to perform an OCR process on each acquired image.

The OCR engine is an engine (program) for performing a process of recognizing characters in the image. The OCR engine recognizes the characters according to a predetermined algorithm. The OCR engine outputs information indicating the recognition result. For example, the OCR engine outputs information including a character code indicating the characters as the recognition result.

The OCR engine also notifies an event related to the OCR process. For example, the event may be completion of analysis of character layout, completion of character recognition of one block, and the like.

The OCR engine may be stored in advance in the storage device 13 and executed by the processor 11. For example, the OCR engine is stored in the storage device 13 at the time of manufacturing the image forming apparatus 10 or the like, such as by pre-installation, concurrent installation with the operating system, or written physically in the storage medium of the storage device 13. In addition, the OCR engine may be updated as appropriate, such as, for example, reinstalled or replaced with newer versions when available, such as, via a network connection or an external storage medium. When executed by the processor 11, the OCR engine may extend to a random access memory, such as, for example, the main memory 12 and/or the page memory 18.

During an OCR process, the processor 11 may execute, such as by order, on one image out of the acquired one or more images. The processor 11 may execute a predetermined process such as a decompression process on the set image.

The processor 11 inputs the set image to the OCR engine. The processor 11 causes the OCR engine to execute an OCR process on the image. When the OCR process for the image is completed, the processor 11 inputs the next image to the OCR engine.

The processor 11 repeats the above operation and causes the OCR engine to perform an OCR process on each acquired image.

The processor 11 also has a function of measuring the time (elapsed time) elapsed since the start of the OCR process for each image.

For example, the processor 11 may measure a period of elapsed time, such as using a timer, and reset the timer for measurements thereafter. The processor 11 starts a timer when the OCR process for the image set in the OCR engine is started.

The processor 11 measures the elapsed time for the OCR process for each image in the same manner.

Further, the processor 11 has a function of causing the OCR engine to stop the OCR process when the elapsed time of the OCR process for each image exceeds a predetermined threshold value.

For example, when the OCR process for the set image is started, the processor 11 determines whether the elapsed time of the OCR process for the image exceeds a predetermined threshold value when the OCR engine notifies an event.

That is, when the OCR engine notifies an event, the processor 11 acquires the elapsed time measured from the timer. The processor 11 determines whether the acquired elapsed time exceeds a predetermined threshold value.

When it is determined that the acquired elapsed time exceeds the predetermined threshold value, the processor 11 causes the OCR engine to stop the OCR process for the image.

The processor 11 may determine whether the elapsed time exceeds a predetermined threshold value with predetermined intervals.

The processor 11 performs the same process for the OCR process on each image.

Further, the processor 11 has a function of restarting the stopped OCR process when a predetermined condition (restart condition) is satisfied.

The processor 11 determines whether the predetermined condition is satisfied when the OCR process is performed on the set image.

The restart condition is a condition for restarting the OCR process for the image.

For example, the restart condition is that the transmission source of the facsimile data is a predetermined transmission source. For example, the user registers an address of a predetermined transmission source in the image forming apparatus 10 in advance. When the address of the transmission source of the facsimile machine is an address registered in advance, the processor 11 determines that the restart condition is satisfied.

In addition, the restart condition is that a job accompanied with the OCR process does not stand by. For example, a job accompanied with OCR is reception of facsimile data accompanied with an OCR process or scanning of an image accompanied with an OCR process. The processor 11 determines that the restart condition is satisfied when the job does not stand by.

Further, the restart condition is that a predetermined keyword is mentioned in the image. For example, the user registers a predetermined keyword in the image forming apparatus in advance. For example, the predetermined keyword is "Invoice." The content of the predetermined keyword is not limited to a specific configuration.

The processor 11 obtains the recognition result until the OCR process for the image is stopped. The processor 11 determines whether the recognition result includes a predetermined keyword. When the recognition result includes a predetermined keyword, the processor 11 determines that the restart condition is satisfied. Otherwise, the processor 11 determines that the restart condition is not satisfied.

In addition, the processor 11 may determine that the restart condition is satisfied when a recognition result of the already completed OCR process (the OCR process for another image) includes a keyword.

Further, the restart condition is that the language of the characters in the image is a predetermined language (for example, English or the like). For example, the user registers a predetermined language in the image forming apparatus 10 in advance.

The processor 11 obtains the recognition result until the OCR process for the image is stopped. The processor 11 determines the language of the characters in the image based on the recognition result. That is, the processor 11 determines the language of the characters indicated by the recognition result. The processor 11 determines that the restart condition is satisfied when the determined language is a predetermined language.

Also, the processor 11 may determine that the restart condition is satisfied when the language of the characters in the image for which the OCR process is completed is a predetermined language.

In addition, the restart condition is that the date and time when the OCR process is stopped is included in a predetermined period. For example, the user registers a period in advance in the image forming apparatus. For example, the predetermined period may be a predetermined time zone (for example, PM 10:00 to AM 6:00), a predetermined day of the week (for example, Saturday or Sunday), or a predetermined date (for example, a holiday). The predetermined period may be a different time zone for each day of the week or date. The predetermined period is not limited to a specific configuration.

The processor 11 acquires the current date and time when the OCR process is stopped. The processor 11 determines that the restart condition is satisfied when the current date and time is included in a predetermined period.

The restart condition may be that any of the above conditions is satisfied. The restart condition may be that a plurality of the above conditions is satisfied. The content of the restart condition is not limited to a specific configuration.

When the restart condition is satisfied, the processor 11 restarts the stopped OCR process. That is, the processor 11 restarts the OCR process continuously to the process completed before the OCR process is stopped.

In addition, when the restart condition is not satisfied, the processor 11 causes the OCR engine to start the OCR process for the next image of the image. In this case, the processor 11 stores information indicating the image (for example, a log indicating a page number) in the main memory 12 or the storage device 13 as an image for which the OCR process is failed. The processor 11 may discard the recognition result until the OCR process is stopped.

Further, the processor 11 has a function of giving information indicating a recognition result to an image.

When the OCR process on the set image is completed, the processor 11 gives information indicating the recognition result to the image. For example, the processor 11 transparently embeds the characters indicated by the recognition result in an area where the characters are described in the image.

The processor 11 gives the information indicating the recognition result to each image in the same manner.

In addition, the processor 11 does not give the recognition result to the image, when the OCR process for the image is stopped and is not restarted.

The processor 11 also has a function of creating a file including each acquired image.

When the OCR process is performed on each image, the processor 11 creates a file including each image to which the information indicating the recognition result is given. When there is an image for which the OCR process is stopped and is not restarted, the processor 11 creates a file without giving the information indicating the recognition result to the image.

For example, the processor 11 creates a portable document format (PDF) file including each image. The format of the file created by the processor 11 is not limited to a specific configuration.

The processor 11 stores the created file in the storage device 13. In addition, the processor 11 may transmit the created file to an external device. The processor 11 may store the created file in an external memory.

The processor 11 also has a function of outputting information indicating an image for which the OCR process is failed.

That is, the processor 11 outputs information indicating an image for which the OCR process is stopped and the restart condition is not satisfied. For example, when the OCR process for each image is completed, the processor 11 displays a log indicating the page number of the image for which the OCR process is failed on the operation panel 15. The processor 11 displays a message indicating the page number. For example, the processor 11 displays a message "OCR of pages 1, 3 and 5 is skipped" on the operation panel 15.

Next, an operation example of the image forming apparatus 10 will be described.

Figure 2:
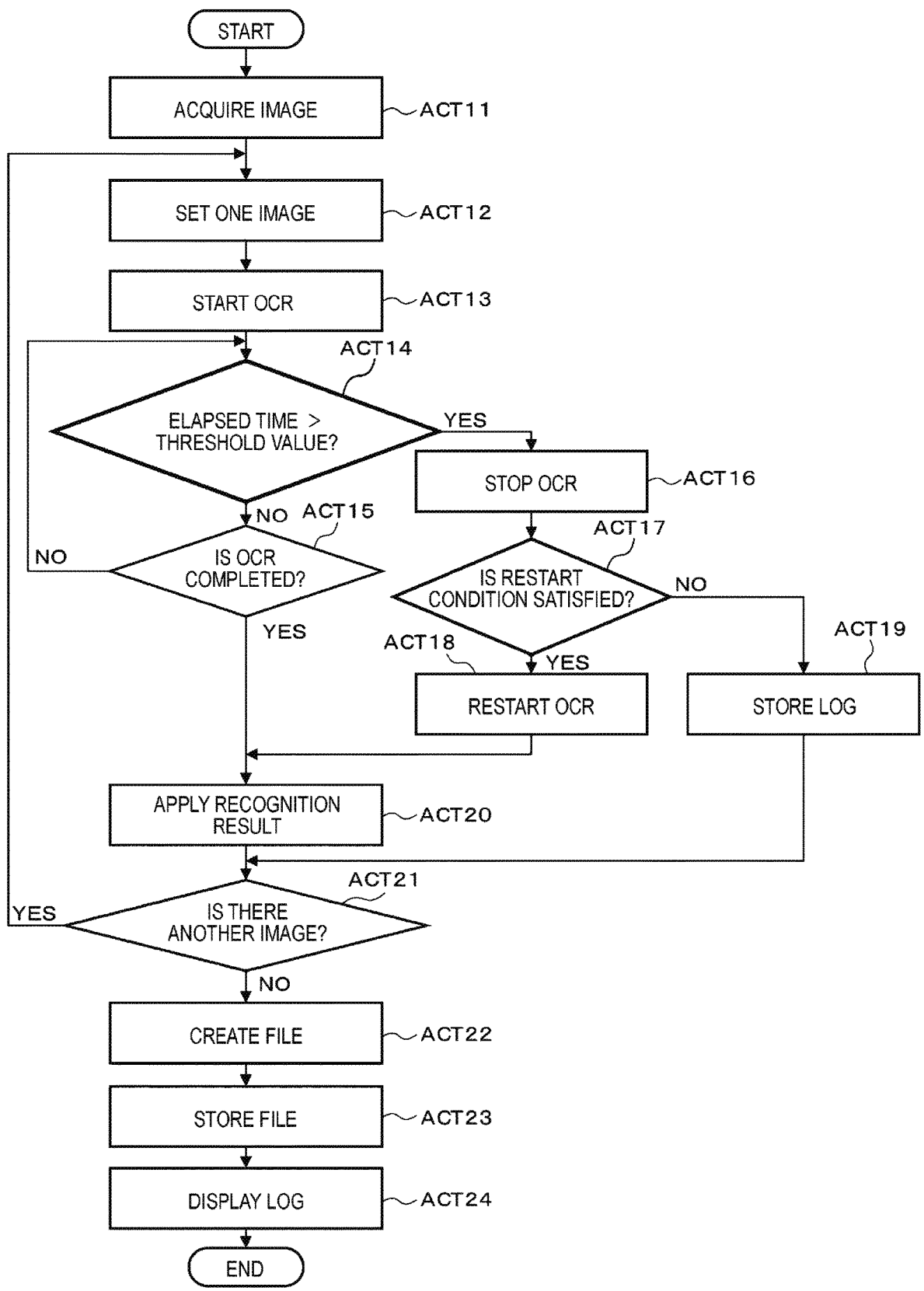
FIG. 2 is a flowchart showing an operation example of the image forming apparatus according to the embodiment.

FIG. 2 is a flowchart for explaining an operation example of the image forming apparatus 10.

First, the processor 11 of the image forming apparatus 10 acquires one or more images (ACT 11). When one or more images are acquired, the processor 11 sets one image out of the acquired one or more images (ACT 12).

When one image is set, the processor 11 causes the OCR engine to start the OCR process on the image (ACT 13). When the OCR process is started, the processor 11 determines whether the elapsed time for the OCR process for the image exceeds a predetermined threshold value (ACT 14).

When it is determined that the elapsed time for the OCR process for the image does not exceed the predetermined threshold value (ACT 14, NO), the processor 11 determines whether the OCR process for the image is completed (ACT 15).

When it is determined that the elapsed time for the OCR process for the image exceeds the predetermined threshold value (ACT 14, YES), the processor 11 causes the OCR engine to stop the OCR process for the image (ACT 16).

When the OCR engine is caused to stop the OCR process for the image, the processor 11 determines whether the restart condition is satisfied (ACT 17). When it is determined that the restart condition is satisfied (ACT 17, YES), the processor 11 causes the OCR engine to restart the OCR process for the image (ACT 18). Here, the processor 11 causes the OCR engine to complete the OCR process for the image.

When it is determined that the restart condition is not satisfied (ACT 17, NO), the processor 11 stores a log indicating the image as an image for which the OCR process is failed (ACT 19).

When it is determined that the OCR process for the image is completed (ACT 15, YES), or when the OCR engine restarts the OCR process for the image (ACT 18), the processor 11 gives information indicating the recognition result of the OCR process to the image (ACT 20).

When the log indicating the image is stored as an image for which the OCR process is failed (ACT 19) or when the information indicating the recognition result of the OCR process is given to the image (ACT 20), the processor 11 determines whether there is another image which is not subjected to the OCR process (ACT 21).

When it is determined that there is another image which is not subjected to the OCR process (ACT 21, YES), the processor 11 returns the process to ACT 12.

When it is determined that there is no other image which is not subjected to the OCR process (ACT 21, NO), the processor 11 creates a file including each image (ACT 22). After creating the file, the processor 11 stores the file (ACT 23).

When the file is stored, the processor 11 displays the log indicating the image for which the OCR process is failed on the operation panel 15 (ACT 24). When the log is displayed on the operation panel 15, the processor 11 ends the operation.

The processor 11 may acquire one or more images through the scanner 16. The processor 11 may also acquire one or more images from an external memory or an external device. The method by which the processor 11 acquires one or more images is not limited to a particular method.

When the elapsed time for the OCR process exceeds a predetermined threshold value, the processor 11 may determine whether the restart condition is satisfied without stopping the OCR process. In this case, the processor 11 stops the OCR process when the restart condition is not satisfied. The processor 11 continues the OCR process when the restart condition is satisfied.

The image forming apparatus configured as described above performs an OCR process on each acquired image. When the time elapsed since the start of the OCR process for a single image exceeds a predetermined threshold value, the image forming apparatus stops the OCR process for the image. As a result, the image forming apparatus can prevent the OCR process from being delayed.

In addition, the image forming apparatus restarts the stopped OCR process when the restart condition is satisfied. As a result, the image forming apparatus can continue the OCR process according to the situation while preventing the OCR process from being delayed.

While certain embodiments have been described, these embodiments have been presented by way of example only, and are not intended to limit the scope of inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An information processing apparatus comprising:
an interface configured to receive an image; and
a processor configured to:
use a character recognition engine to execute a character recognition process of the image;
use a timer to determine an elapsed time starting from start of the character recognition process for the image, and when the elapsed time exceeds a predetermined threshold value, stop the character recognition process for the image;
evaluate a restart condition, and when the restart condition is satisfied, restart the character recognition process for the image, and when the restart condition is not satisfied, store a log indicating the character recognition process has failed.

2. The apparatus according to claim 1, wherein
the interface is configured to acquire a plurality of images, and
the processor uses the character recognition engine to execute the character recognition process for a next image in the plurality of images when the restart condition is not satisfied.

3. The apparatus according to claim 1, wherein
the interface is configured to receive the image by acquiring the image via a facsimile machine.

4. The apparatus according to claim 3, wherein
the restart condition is satisfied when a transmission source of facsimile data is a predetermined transmission source.

5. The apparatus according to claim 1, wherein
the restart condition is satisfied when at least one of the following events occurs: (1) a job accompanied with the character recognition process does not stand by, (2) a predetermined keyword is mentioned in a recognition result of the character recognition process, (3) a language of characters indicated by a recognition result of the character recognition process is a predetermined language, or (4) a date and time when the character recognition process is stopped is included in a predetermined period.

6. The apparatus according to claim 1, wherein
the processor is configured to output information indicating a recognition result of the character recognition process for the image when the character recognition process for the image is completed.

7. The apparatus according to claim 6, wherein
the processor is configured to create a file including the image.

8. The apparatus according to claim 1, wherein
the processor is configured to output information indicating an image for which the character recognition process is not completed.

9. A method for processing information containing images, the method comprising:
acquiring an image;
executing, with a character recognition engine, a character recognition process for the image;
determining an elapsed time measured from a start of the character recognition process;
stopping, when the elapsed time exceeds a predetermined threshold value, the character recognition process of the image;
restarting, when a restart condition is satisfied, with the character recognition engine, the character recognition process for the image, and
storing, when the restart condition is not satisfied, a log indicating the character recognition process has failed.

10. The method of claim 9, wherein acquiring the image comprises receiving one or more images from at least one of a scanning device or a facsimile machine.

11. The method of claim 10, wherein acquiring the image comprises receiving two or more images and wherein the character recognition engine is configured to determine a first image for executing the character recognition process.

12. The method of claim 9, further comprising, upon a determination that the elapsed time does not exceed the predetermined threshold value, determining whether the character recognition process has completed.

13. The method of claim 12, further comprising, upon a determination that the character recognition process has completed, applying a recognition result.

14. The method of claim 9, wherein the restart condition is satisfied when at least one of the following events occurs: (1) a job accompanied with the character recognition process does not stand by, (2) a predetermined keyword is mentioned in a recognition result of the character recognition process, (3) a language of characters indicated by a recognition result of the character recognition process is a predetermined language, (4) a transmission source of facsimile data is a predetermined transmission source, or (5) a date and time when the character recognition process is stopped is included in a predetermined period.

15. An image forming apparatus for recognizing characters, the image forming apparatus comprising:
a scanner;
an input image processing unit connected to the scanner;
a processor connected to the input image processing unit;
a storage device connected to the processor, wherein the storage device includes a character recognition engine executable by the processor; and
an interface configured to send or receive image documents,
wherein the processor, upon execution of the character recognition engine, is configured to:
acquire a plurality of images from the scanner or the interface;
select a first image to undergo a character recognition process;
determine a first elapsed time measured from a start of the character recognition process of the first image;
stop, upon the first elapsed time exceeding a threshold value, the character recognition process of the first image, and start another character recognition process on a next image;
restart, when a restart condition is satisfied, with the character recognition engine, the character recognition process of the first image.

16. The image forming apparatus of claim 15, further comprising an operation panel connected to the scanner for receiving instructions related to a start of the character recognition process.

17. The image forming apparatus of claim 15, further comprising:
an output image processing unit connected to the input image processing unit, the output image processing unit receiving a result of the character recognition process; and
a forming unit connected to the output image processing unit.

18. The image forming apparatus of claim 17, further comprising a communication unit connected to the storage device and the forming unit, wherein the storage device is configured to output a file including a result of the character recognition process.

19. The image forming apparatus of claim 15, wherein the restart condition is satisfied when at least one of the following events occurs: (1) a job accompanied with the character recognition process does not stand by, (2) a predetermined keyword is mentioned in a recognition result of the character recognition process, (3) a language of characters indicated by a recognition result of the character recognition process is a predetermined language, (4) a transmission source of facsimile data is a predetermined transmission source, or (5) a date and time when the character recognition process is stopped is included in a predetermined period.

* * * * *